Patented Aug. 14, 1928.

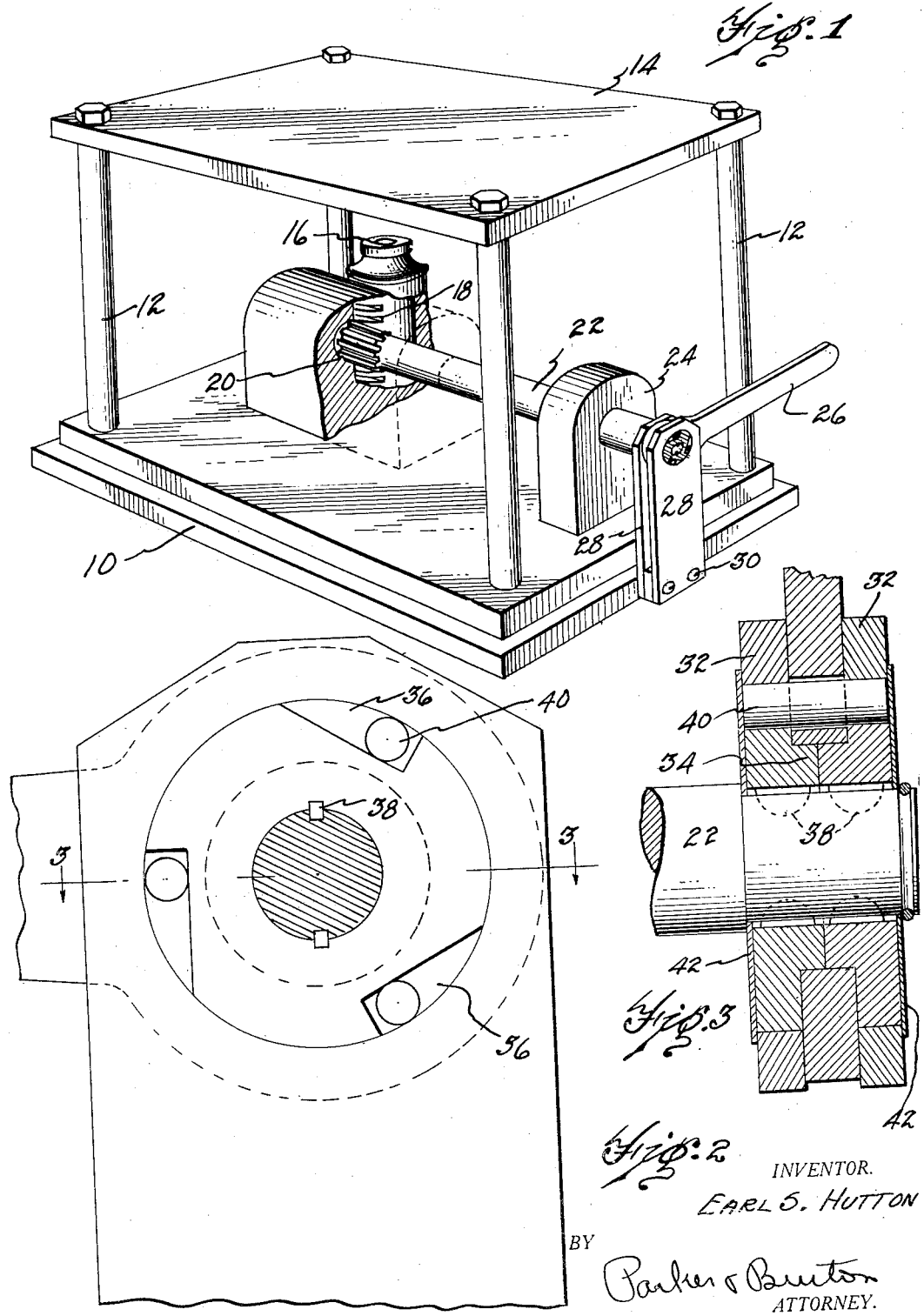

1,680,618

UNITED STATES PATENT OFFICE.

EARL S. HUTTON, OF DETROIT, MICHIGAN, ASSIGNOR OF ONE-THIRD TO ALAN H. PEARSON, OF DETROIT, MICHIGAN.

LOCKING MECHANISM.

Application filed August 3, 1925, Serial No. 48,008. Renewed May 31, 1928.

My invention relates to improved locking mechanism intended particularly for use in connection with work holders and other similar devices.

An object is to provide simple, inexpensive, positively operating mechanism adapted to securely, automatically, releasably lock an adjustable work holder to grip the piece of work carried thereby.

A further object is to provide in connection with a work support comprising in part a rotatable shaft, manually operable means for rotating the shaft and locking mechanism adapted to automatically releasably lock the shaft against an impulse of rotation applied thereto other than through the manually operating means provided.

An important feature is the employment in mechanism of the character described having a rotatable shaft provided with a notched disk and bearing for the disk, of an operating crank coupled with the shaft by means engaged in the notch of the disk to rotate the shaft through the disk, such means being adapted to automatically releasably lock the shaft against rotation upon an impulse of rotation applied thereto other than through the crank by locking the disk within its bearing.

A meritorious feature is the provision in work supporting mechanism provided with a rotatable shaft, of a pair of spaced notched disks fixed to the shaft mounted within stationary bearings and a handle to rotate the shaft mounted between the disks and coupled with the shaft for rotation by means engaged in the notches of the disks adjacent to the bearings, whereby the shaft may be freely rotated from the handle but will be locked against rotation upon an impulse applied from the shaft to the handle.

Other objects and details of construction, together with important advantages and features of my improvement, will appear more fully from the following specification, appended claims, and accompanying drawings, in which:

Figure 1 is a perspective view of a common form of work holder provided with my improvement.

Fig. 2 is an enlarged elevation of my invention.

Fig. 3 is a cross-sectional view taken on line 3—3 of Fig. 2.

I have shown my invention in connection with a work holder of a well known form having a base 10, uprights 12, one at each corner, and a top plate 14. This plate 14 forms one member of a pair of work retaining members, the other member being formed by a movable plunger 16 which is adapted to be raised and lowered by suitable mechanism, such as a rack and pinion coupling. I have here shown the spindle as provided with a rack 18 meshed with a pinion 20 formed on the shaft 22. 24 is a supporting member for the shaft 22. To rotate the shaft to actuate the member 16 there is provided a handle or crank 26.

My invention relates to improved mechanism for coupling this crank 26 with the shaft 22 to rotate the shaft to raise and lower the movable work supporting member 16 and to retain the shaft at any position to which it may have been rotated to actuate said movable work supporting member in such a manner that it is held against any back thrust exerted thereon from the work supporting member but is quickly and easily releasable upon an impulse of rotation applied thereto from the crank.

I provide a pair of spaced apart supporting standards 28 secured at 30 to the base. The shaft 22 carries a pair of spaced disks 32 having adjoining hubs 34. One of these disks is mounted in a bearing in one of the standards 28. The other disk is mounted in a corresponding bearing in the opposite standard.

These disks are cut away or notched as at 36 at a plurality of corresponding points. They are secured to the shaft by keys 38. The cut-outs or notches in the disks are adjacent to the bearings in the supports.

The crank 26 is freely mounted between the disks upon their adjoining hubs 34. This crank carries a plurality of freely rotatable pins 40 which project into the notches or cut-outs 36 of the disks, as shown in Figs. 2 and 3, and are held in place by suitable means such as washers 42 disposed on the shaft 22. The outer washer 42 is held on the shaft by a retaining spring 44.

In the operation of the device when the handle or crank 26 is swung in a counter-clockwise direction from the position shown in Fig. 1, the shaft 22 is rotated to raise the work supporting member 16 to grip the work against the plate 14, the rollers or pins 40 bearing the flattened sides of the disks 32 and imparting a rotatable motion to the shaft 22 to actuate the work support 16. When this member 16 has been raised to hold the work against the plate 14 continuation of the swinging movement of the handle wedges the rollers between the flat faces of the disks and the bearings for the disks in the standards and locks the device in position to rigidly support the work. Any back pressure upon the shaft from the work tending to release the grip upon the work serves to wedge the pins more tightly in place and the release can only be accomplished through the operation of the crank 26. By swinging the handle in a clockwise direction the pins are moved out of their wedged position and against the shoulders on the flattened faces of the disks and the shaft is operated in a clockwise direction to lower the work supporting member 16, releasing the work.

Obviously this locking means might be employed in connection with work retaining devices different from that illustrated in the drawing.

What I claim is:

1. In locking mechanism, a rotatable shaft, a disk fixed to the shaft, a casing surrounding the disk, said disk having a cut-out adjacent to the casing, a crank mounted upon the shaft to rotate the same, said crank coupled with the shaft through the disk by a part engaged in the cut-out of the disk and adapted to be wedged between the disk and the casing upon application of an impulse of rotation to the disk from the shaft.

2. In locking mechanism, a rotatable shaft, a notched disk on the shaft, said disk having a hub, a bearing for the disk, a crank mounted on the hub of the disk adjacent to the bearing and provided with a pin extending into the notch of the disk adjacent to the bearing to couple the shaft to the crank for rotation thereby, said pin adapted to be wedged between the bearing and the disk to prevent the rotation of the shaft counter the crank.

3. In locking mechanism, a rotatable shaft, a notched disk fixed to the shaft, a bearing for the disk, a crank rotatably mounted upon the shaft adajacent to the disk having a rotatable pin extending into the notch of the disk adjacent to its bearing to couple the shaft to the crank through the disk for rotation, said pin adapted to be wedged between the disk and its bearing to prevent rotation of the shaft upon an impulse of rotation applied thereto counter the crank.

4. In locking mechanism, a pair of spaced supports, a rotatable shaft having spaced notched disks fixed thereto, one mounted within a bearing in each support, a crank rotatably mounted upon the shaft between the disks provided with a pin extending into the notches of the disks to couple the shaft to the crank to be rotated thereby, said pin adapted to be wedged between the disks and their bearings to prevent rotation of the shaft upon an impulse of rotation applied therefrom to the disks.

5. In locking mechanism, a pair of spaced supports, a rotatable shaft carrying a pair of correspondingly notched disks, one having a bearing in each support, a crank mounted upon the shaft between the disks provided with a plurality of pins extending into the notches of the disks to couple the crank to the shaft for rotation, said pins adapted to lock the disks against rotation upon an impulse of rotation applied thereto from the shaft.

6. In locking mechanism, a pair of spaced supports, a rotatable shaft carrying a pair of spaced correspondingly notched disks having adjoining hubs, said disks having bearings in the supports, a crank rotatably mounted between the disks upon said hubs, said crank provided with rotatable pins extending into the notches of the disks adjoining their bearings, coupling the crank to the shaft to rotate the shaft and adapted to lock the disks against rotation upon an impulse of rotation applied thereto from the shaft.

7. In a locking mechanism, a rotatable shaft, a disk fixed to the shaft, a casing disposed exteriorly of the disk, said disk having a cut-out adjacent to the casing, a crank to rotate the shaft, said crank coupled with the shaft by a rotatable part loosely engaged within the cut-out of the disk and adapted to be wedged between the disk and the casing to releasably lock the shaft against rotation upon an impulse of rotation imparted from the shaft to the disk.

8. In locking mechanism, a rotatable shaft, a notched disk fixed to the shaft, a casing surrounding the disk, a crank mounted upon the shaft, a roller coupling the crank with the disk, said roller being mounted within the notch of the disk and adapted to be wedged between the disk and the casing upon an impulse of rotation imparted from the shaft to the disk.

9. In locking mechanism for a work holder having a movable work support and a rotatable shaft to actuate said support, a disk fixed to the shaft, a casing about the disk, said disk having a recess adjacent to said casing, a crank on the shaft, a rotatable pin coupling the disk with the crank for rotation upon swinging movement of the crank, said pin loosely disposed within the recess of the disk and adapted to be wedged between the disk and the casing to lock the shaft against rotation upon an impulse of rotation applied from the shaft to the crank.

10. Locking mechanism comprising, in combination, a rotatably supported shaft, a disk carried thereby, a casing encircling the disk, said disk having a flattened face opposite the encircling wall of the casing; a crank member coupled with the disk to rotate the shaft, a locking pin movably arranged between the flattened face of the disk and the encircling wall of the casing to be wedged therebetween upon an impulse of rotation applied to the disk from the shaft in a given direction, said locking pin adapted to be released upon an impulse of rotation applied to the disk by the crank member in the same direction.

11. Locking mechanism comprising, in combination, a rotatably supported shaft, a disk carried thereby, a casting encircling the disk, said disk provided with a flattened face extending along a chord of the disk, a crank member arranged alongside the disk and coupled therewith to rotate the shaft, a locking pin slidably arranged between the flattened face of the disk and the opposite wall of the casing to be wedged therebetween upon an impulse of rotation applied by the shaft to the disk in a given direction, said crank member having a part adapted to act upon the locking pin to urge it out of its wedged position upon a similar impulse of rotation applied therefrom to the disk.

12. Locking mechanism comprising, in combination, a rotatably supported shaft, a disk carried thereby, a casing encircling the disk, said disk provided with a flattened face extending along a chord thereof, a crank member coupled with the disk to rotate the shaft, a locking element movably disposed between the flattened face of the disk and the wall of the casing to be wedged therebetween upon the application of an impulse of rotation by the crank member to the disk in a given direction and to be wedged between said flattened face and the wall of the casing to prevent reverse rotation of the shaft upon a reverse impulse of rotation applied to the disk from the shaft, said locking element adapted to be engaged by a part of the crank member to be dislodged from its wedged position to permit reverse rotation of the shaft upon the application of said reverse impulse of rotation to the disk by the crank member.

13. Locking mechanism comprising, in combination, a rotatably supported shaft having an annular portion provided with at least one flattened peripheral face, a stationary casing encircling said annular portion, a crank member coupled with the shaft through said annular portion to rotate the shaft in either direction, a locking pin movably arranged between the flattened face of the annular position and the wall of the casing to be wedged therebetween upon an impulse of rotation transmitted from the shaft to the annular portion in a given direction, said crank member having a part adapted to act upon said locking pin to dislodge it from its wedged position upon rotation applied therefrom to the annular portion of the shaft to rotate the shaft in the same direction.

14. Locking mechanism comprising, in combinaton, a rotatably supported shaft, a bearing encircling a portion of the shaft, said portion having a flattened face positioned opposite the encircling wall of the bearing and terminating at one end in a shoulder, a crank member coupled with said portion to rotate the shaft, a locking element movably arranged between said flattened face and the bearing to move away from said shoulder and toward the bearing to be wedged between the wall of the bearing and the flattened face to prevent rotation of the shaft upon application of a given impulse of rotation to the shaft, said crank member adapted to move said locking element toward said shoulder dislodging the same and releasing the shaft for rotation upon rotation of the crank in a given direction.

15. Locking mechanism comprising, in combination, a rotatably supported shaft having an annular portion provided with at least one flattened peripheral face, a stationary casing encircling said annular portion, a crank member coupled with said annular portion to rotate the shaft, a locking pin movably disposed between the flattened face of the annular portion and the wall of the casing to be wedged therebetween upon a determined impulse of rotation transmitted from the shaft to the annular portion, said crank having a part engaging said pin to dislodge it from its wedged position upon rotation of the crank in a given direction and to rotate the shaft through the pin in said direction.

In testimony whereof, I sign this specification.

EARL S. HUTTON.